J. S. GOLDBERG.
GREASE CUP.
APPLICATION FILED DEC. 14, 1914.

1,168,389.

Patented Jan. 18, 1916.

Witnesses:
Frederick S. Pierce
John A. Dirnne

Inventor:
John S. Goldberg
By Brown, Hanson & Boettcher
Attorneys

UNITED STATES PATENT OFFICE.

JOHN S. GOLDBERG, OF CHICAGO, ILLINOIS, ASSIGNOR TO ALEMITE METALS COMPANY, OF CHICAGO, ILLINOIS, A CORPORATION OF ILLINOIS.

GREASE-CUP.

1,168,389.

Specification of Letters Patent.   Patented Jan. 18, 1916.

Application filed December 14, 1914.   Serial No. 877,069.

*To all whom it may concern:*

Be it known that I, JOHN S. GOLDBERG, a citizen of the United States, residing at Chicago, in the county of Cook and State of Illinois, have invented a certain new and useful Improvement in Grease-Cups, of which the following is a full, clear, concise, and exact description, reference being had to the accompanying drawings, forming a part of this specification.

This invention relates to grease-cups.

Grease-cups of the compression type are especially adapted to provide lubrication for parts of machinery subject to exposure and rough handling, and are in fact the only practical means for lubricating certain elements of machinery, such as revolving gears, pulleys, automobile springs and bearings, transmission shafts, and the like. The jarring and rough treatment incident to the use of such machinery is liable to unscrew the parts of the grease-cup and expose the interior of the cup to the entry of grit, dirt and other foreign matter, as well as losing part of the cup.

One of the objects of my invention is to provide improved means for preventing the unscrewing or loosening of the parts of a grease-cup or similar device.

A further object is to improve the construction and cheapen the cost of manufacture of a grease-cup or similar device.

Figure 1:
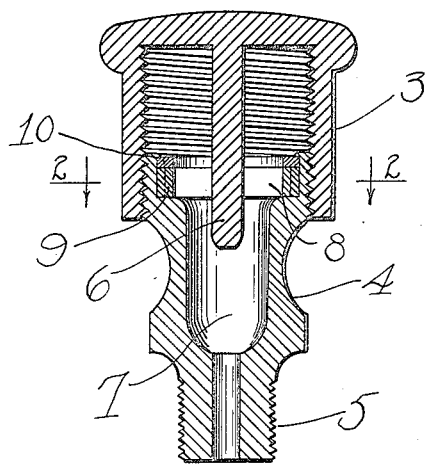
Figure 2:
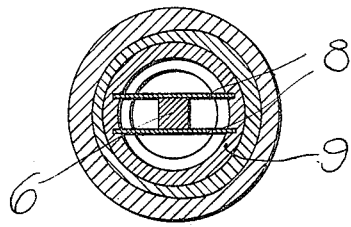

In the accompanying drawings: Figure 1 is a vertical longitudinal cross-section of a grease-cup embodying my invention. Fig. 2 is a transverse cross-sectional view taken on the line 2—2 of Fig. 1.

The grease-cup shown in Fig. 1 comprises essentially a cap or barrel 3, and a stem 4. The stem 4 is provided with a screw-threaded nipple 5 for attaching the cup to the bearing or the like. The cap and the stem are screw-threaded to coöperate so that screwing down of the cap may compress the grease contained therein and force the same out through the bore of the nipple 5. The stem is preferably milled hexagonally, in order to provide suitable gripping faces to screw the nipple 5 into its socket. The barrel 3 is knurled at the top, in order to facilitate screwing together of the parts 3 and 4.

As a means for preventing unscrewing of the cap and the stem, I provide a pair of spring arms 8, secured to the stem by being placed in suitable notches cut or formed in said stem. The spring arms 8 are placed sufficiently far apart to allow a projection 6, which is secured to the cap 3, to pass between them. The projection 6, which may be made of a separate part or may be integral with the cap 3, has flat faces on its sides. I have shown it as square in cross-section, although it is evident that any preferred form may be employed, or that the projection may be made in polygonal form. As a means for mounting the spring arms 8 I have shown a separate ring 9, seated in the stem 4 and secured in place by a washer 10, which is forced into the open end of the stem above the ring 9, in order to secure the ends of the spring arms 8 in position, as well as to hold the ring 9 in its position.

I consider it to be equivalent that the parts be made of die-castings, in which event it will be unnecessary to make the ring 9 of separate material or to employ the ring 10 to hold the parts therein, as the notches which receive the ends of the spring arms may be formed in the casting, and the spring arms 8 may be secured in said notches, as by battering over the metal above the spring arms.

The stem 4 is provided with an enlarged counterbore 7, into which the projection 6 may extend when the cap 3 is threaded down upon the stem 4. The end of the projection 6 may be rounded off in order to aid in centering the cap 3 when the same is to be secured to the stem 4.

The operation of the cup is obvious from an inspection of the drawings. The projection 6 is held in position by means of the spring arms 8 on account of the cam action of these spring arms upon the flat faces of the projections.

It is obvious that numerous changes will become apparent to those skilled in the art, such, for instance, as reversing the relative positions of the projections and the spring arms, which I consider to be equivalent structures. It will also be apparent that an equivalent structure results where the spring arms are formed of a single piece of metal of recurved or hair-pin shape. All of these modifications I consider to come within the spirit and scope of my invention, and to be included within the wording of the appended claims.

What I claim as new and desire to protect by Letters Patent of the United States is the following:

1. In a grease-cup or the like, a pair of screw-threaded parts forming a compression chamber, a projection having flat sides mounted on one of said parts, notches in the other of said parts, and a pair of spring arms extending eccentrically across said last mentioned part and embracing said projection to prevent relative rotation of said parts, the ends of said spring arms being secured in said notches.

2. In a grease-cup or the like, a screw-threaded stem, notches in said stem, a spring having its ends secured in said notches and extending eccentrically across said stem, a cap for said stem, and a flat projection carried by said cap coöperating with said spring to hinder unscrewing of the parts.

3. In a grease-cup or the like, a screw-threaded stem, notches in said stem, a spring having its ends secured in said notches and extending eccentrically across said stem, a cap for said stem, a flat projection coöperating with said spring to hinder unscrewing of the parts, said projection being secured to said cap, and means for securing said spring in said notches.

4. In a grease-cup or the like, a screw-threaded stem, notches in said stem, a spring having a pair of arms secured in said notches, said arms extending eccentrically across said stem, a cap for said stem, a flat projection coöperating with said spring and secured to said cap.

In witness whereof, I hereunto subscribe my name this 12th day of Dec., A. D. 1914.

JOHN S. GOLDBERG.

Witnesses:
F. E. JOHNSON,
ERNEST W. RAPALEE.